United States Patent [19]
Morrison et al.

[11] 3,765,693
[45] Oct. 16, 1973

[54] TOY VEHICLE

[75] Inventors: Howard J. Morrison, Highland Park; Marvin I. Glass, Chicago, both of Ill.

[73] Assignee: Marvin Glass & Associates, Chicago, Ill.

[22] Filed: Feb. 8, 1971

[21] Appl. No.: 113,206

[52] U.S. Cl.................. 280/1.182, 46/104, 280/218
[51] Int. Cl.............................................. A63g 19/00
[58] Field of Search.................... 280/1.182, 1.13, 280/218; 46/126, 104, 106; 297/215, 195

[56] References Cited
UNITED STATES PATENTS

| | | | |
|---|---|---|---|
| 2,802,671 | 8/1957 | Skoggard | 280/1.182 |
| 2,476,915 | 7/1949 | Romero | 280/1.182 |
| 2,896,948 | 7/1959 | Brodrib | 46/123 |
| 3,153,300 | 10/1964 | Keech | 46/123 |
| 3,395,483 | 8/1968 | Mullins | 46/123 |
| 2,862,330 | 12/1958 | Malsed | 46/123 |
| 1,788,798 | 1/1931 | Lesot | 280/1.13 UX |
| 1,520,156 | 12/1924 | Starck | 297/215 |
| 3,181,270 | 5/1965 | Trevena | 46/104 |

FOREIGN PATENTS OR APPLICATIONS

| | | | |
|---|---|---|---|
| 416,960 | 12/1946 | Italy | 280/1.182 |

*Primary Examiner*—Leo Friaglia
*Attorney*—Hofgren, Wegner, Allen, Stellman & McCord

[57] ABSTRACT

An operator-propelled vehicle characterized by the provision of a flexible medial portion having a spring frame member therein and housing portions on opposite ends of the medial portions supporting forward and rear axles and associated wheels. A pawl and ratchet mechanism is associated with each axle so that deformation of the spring imparts a driving motion to the forward wheel while holding the rear wheel against movement, and return of the spring releases the rear wheels to intermittently advance the vehicle responsive to thrust imposed on the medial portion.

1 Claim, 8 Drawing Figures

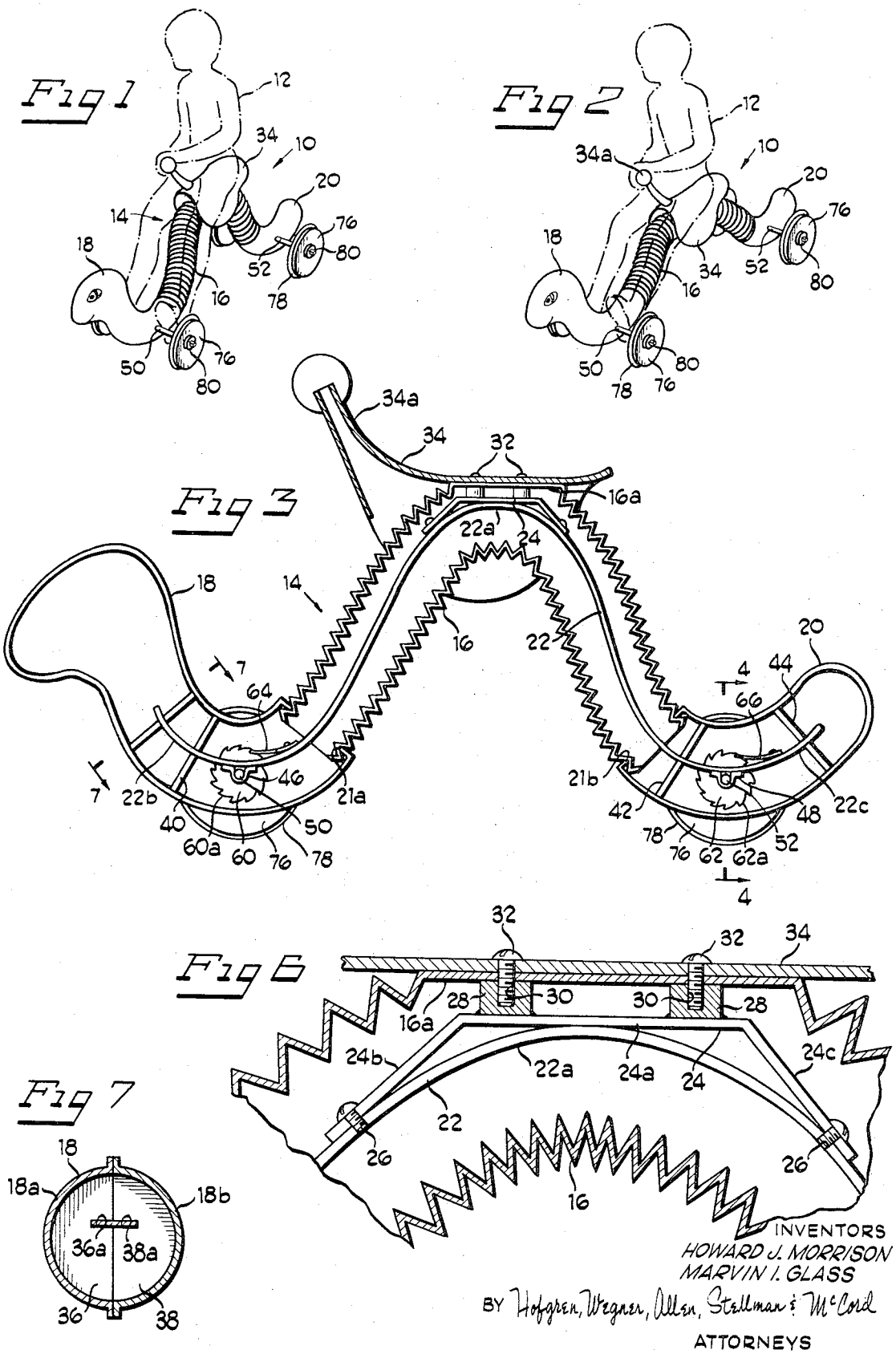

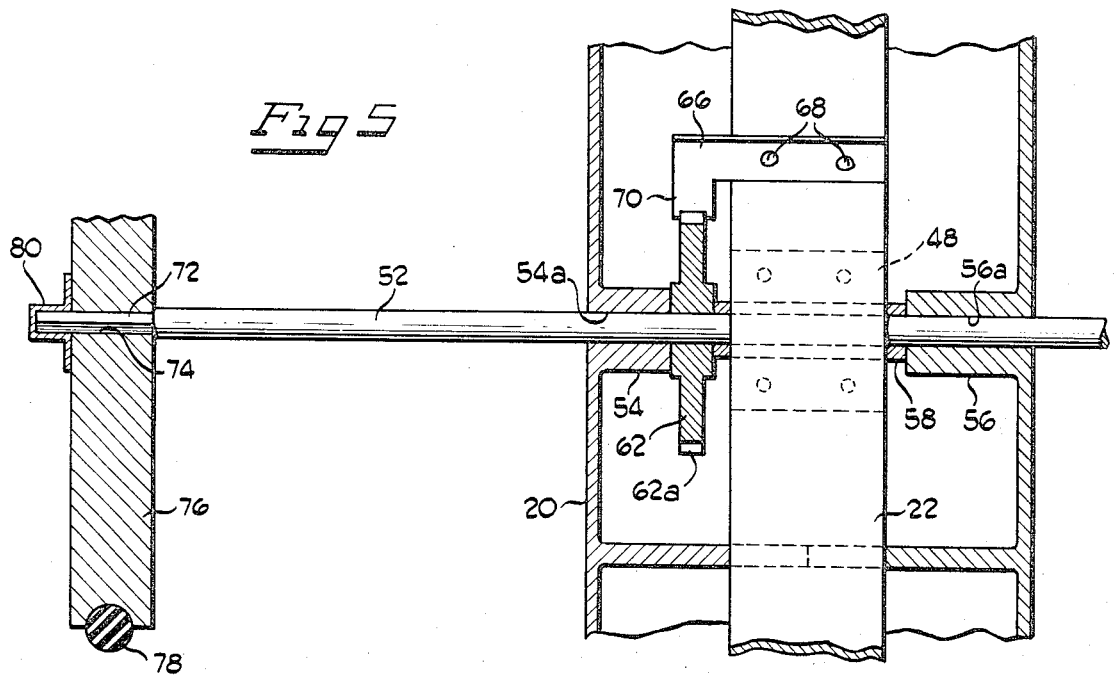
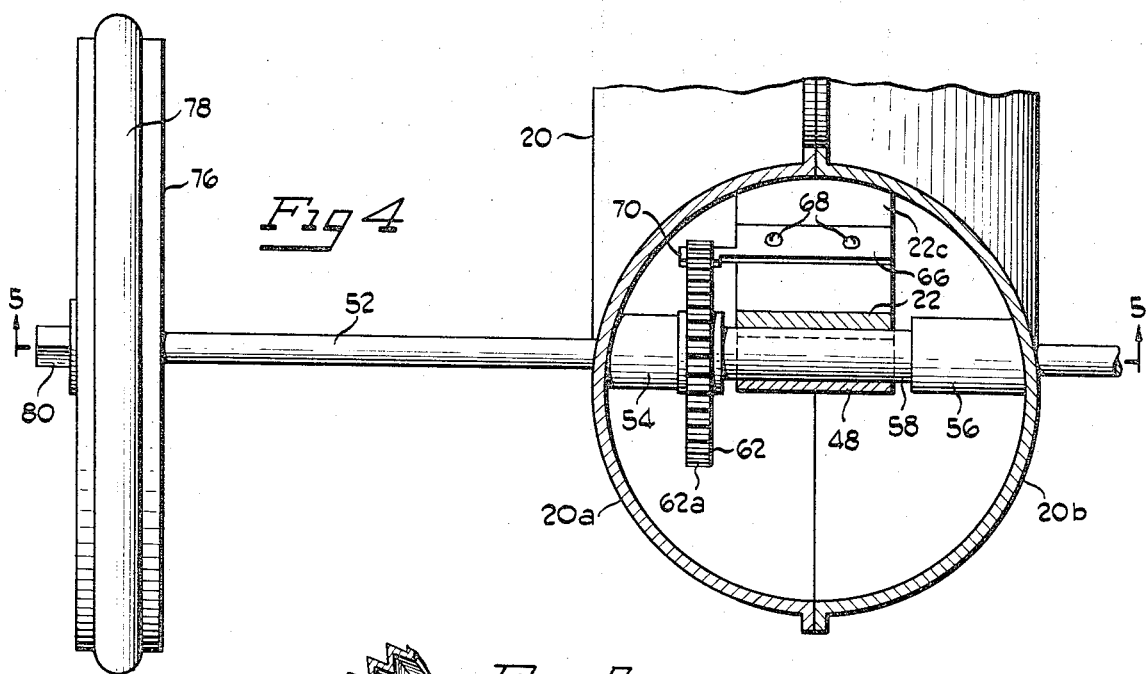
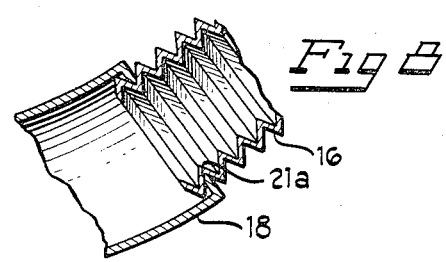
INVENTORS
HOWARD J. MORRISON
MARVIN I. GLASS

TOY VEHICLE

BACKGROUND OF THE INVENTION

1. Field of the Invention

This invention relates to toy devices and more particulary, to a toy, operator-propelled vehicle.

2. Brief Description of the Prior Art

There are numerous examples of self-propelled vehicles in the art. Typically, the vehicles are propelled by some sort of a pumping motion, such as associated with bicycles and tricycles and the like. In addition, some vehicles are propelled by direct foot contact with a supporting surface. There are few examples of vehicles in the art where the occupant propells the vehicle by body thrust imposed thereon, rather than by leg or hand pumping motion. Examples are the Huffman Jr. U.S. Pat. No. 3,337,239, 1 and Dunlap U.S. Pat. No. 3,511,520. In the vehicle shown in each of these patents, the occupant imparts a downward thrust to the seat of the vehicle. The seat is associated with linkage which terminates in a member in engagement with a supporting surface. Thus, thrust imparted to the seat is transferred, through toggle-like action, to forward motion of the vehicle.

There are also examples in the art of toys having an expansible or flexible portion with interior motor means to impart movement to the flexible portions or expansible portions to stimulate movement of the toy. Examples of these patents are as follows:

| | |
|---|---|
| Lohr, R. J. | No. 2,629,967 |
| Dawson, C. F. | No. 2,596,216 |
| Kupka, E. F. | No. 2,232,615 |
| Kinberg, B. | No. 3,456,381 |
| Schwartz, A. | No. 3,490,172 |

None of the devices shown in these partents are intended to be occupied by a user, but instead, are intended to either be pulled by a user or to advance as a result of motion transmitting means self-contained within the toy.

SUMMARY OF THE INVENTION

This invention is directed in brief, to the provision of an improved operator-propelled vehicle.

The best mode currently contemplated for carrying out the invention includes the provision of a body having a yieldable medial portion and rigid opposite ends. A sinuous leaf spring is supported in the interior of the body and wheel supporting axles are rotatably mounted in the opposite end portions. The spring has a pawl element at the opposite ends thereof, and the axles have ratchet members in engagement with the pawls. The operator is intended to sit on the raised medial portion of the flexible body. As the operator exerts downward thrust, this causes the spring to deform, causing the rear axle to be held against advancement and the forward axle to be rotated, thereby permitting forward rotation of the front wheels. When the spring returns, the front wheel is held against movement and the rear axle is allowed to rotate forwardly.

BRIEF DESCRIPTION OF THE DRAWINGS

FIG. 1 is a perspective view of the operator-propelled vehicle of this invention showing the body in a contracted state;

FIG. 2 is a perspective view similar to FIG. 1 showing the body of the vehicle in an extended or flexed state;

FIG. 3 s a verticle section view through the operator-propelled vehicle of this invention;

FIG. 4 is a section view taken generally along the line 5-5 of FIG. 3;

FIG. 5 is a section view taken generally along the line 5—5 of FIG. 4;

FIG. 6 is a fragmentary enlarged section view through the medial portion of the body of the vehicle of this invention illustrating the connection of the seat portion in greater detail;

FIG. 7 is a section view taken generally along the line 7-7 of FIG. 3; and

FIG. 8 is a fragmentary section view of the connection of the rigid end portions of the body to the spring frame.

While this invention is susceptible of embodiment in many different forms, there is shown in the drawings and will herein be described in detail a specific embodiment therefor, with the understanding that the present disclosure is to be considered as an exemplification of the principles of the invention and is not intended to limit the invention to the embodiment illustrated.

BRIEF DESCRIPTION OF THE PREFERRED EMBODIMENT

The operator-propelled vehicle 10 of this invention is intended to be occupied by child 12. The vehicle 10 includes a body 14 shown in the illustrated embodiment as being in a simulated worm form. It is to be understood that the body could be formed in the shape of other different animals, insects or vehicles, or the like.

The body 14 includes a medial flexible housing 16, preferably made of an accordian pleated plastic which has a flat portion 16a at the top of the apex thereof. The body further includes opposite rigid end housing portions 18 and 20 each of which is comprised of two semicylindrical halves 18a, 18b and 20a, 20b, respectively. The rigid housing end portins 18 and 20 are provided with internal flanges 21a and 21b terminating in a collar-like opening for receiving the opposite ends of the accordian pleated medial flexible housing 16, as best seen in FIGS. 3 and 8.

A sinuous spring frame element 22, preferably made of a flat elongate leaf spring metal bent into a segmental sinuous shape, extends through the body from one opposite end portion 18, through the medial portion 16, to the other opposite end portion 20. The spring has a medial raised portion or deformable apex 22a and opposite upturned ends 22b and 22c which are located in the opposite end portions 18 and 20, respectively.

A seat supporting bracket 24, having a flat or horizontal medial portion 24a is secured to the spring 22 at the medial raised portion 22a thereof. The seat support bracket 24 includes depending ends 24b and 24c through which fasteners 26 extend into engagement with the spring frame element 22 to connect the bracket thereto. The top of the medial portion 24a of bracket 24 has spaced upstanding studs 28 with threaded apertures 30 therein for receiving fasteners 32 which extend through a saddle or seating member 34 to secure the seat 34 to the body 14. The seat 34 may be provided with a gripping member in the form of a simulated upright saddle horn 34a.

Each of the opposite end portions 18 and 20 includes pairs of semicircular cross webs such as 36 and 38 which are slotted at 36a and 38a to connect the opposite end portions to the spring member 22. The web shown in detail in FIG. 7 is illustrative of the cross web structure 40, 42 and 44 as well.

The end portions 22b and 22c of the spring 22 have connected thereto, axle support brackets 46 and 48 for supporting forward and rear axles 50 and 52, respectively. The axles extend through hubs 54 and 56 having openings 54a and 56a therethrough, which are in general alignment with the axle support brackets 46 and 48. The portion of the axles 50 and 52 between the hubs 54 and 56 may be provided with a bearing sleeve 58 which extends through the bracket 48.

Each of the forward and rear axles is provided with a thrust receiving and transferring means shown in the illustrated embodiment as a ratchet gear 60 and 62 having a toothed periphery 60a, and 62a, respectively. In addition, each of the forward and rear portions 22b and 22c of the spring 22 is provided with a thrust limiting member shown in the illustrated embodiment as a pawl 64 and 66, respectively. Each pawl is secured, by means of fastener 68, to the spring 22. Further, each pawl is provided with a forwardly directed pawl finger 70 which extends into engagement with the toothed periphery 60a and 62a of ratchet gear 60 and 62, respectively.

The opposite ends of each of the axles 50 and 52 is provided with a geometrically irregular peripheral portion, such as the square stub end 72, which extends though opening 74 in wheel 76. For comfort in riding as well as reducing noise, each of the wheels 76 may be provided with a tire 78, of a suitable flexible material. A cap nut 80, or similar fastening member may be provided for holding the wheel on the opposite stud end 72 of each of the axles 50 and 52.

In use, the child occupant 12, may sit on the seat or saddle 34 and support his feet on a supporting surface, or on the forward axle 50, in the area between the wheels 76 and the body 14 as illustrated in dotted outline in FIGS. 1 and 2. From the position of contraction as shown in FIG. 1, the child may thrust his body downwardly causing the spring to flex or deform as shown in FIG. 2. This will cause the front wheels to roll forwardly since the forward pawl finger 64 will retract relative to front axle ratchet 60. The rear pawl 66 will remain in engagement with rear ratchet 62, preventing rearward movement of the rear wheels. As the spring returns to its normal confguration the front pawl 64 will hold thr front axle against rearward rotation while forward rotation of the rear axle will be permitted. Repeated thrusting movement through cycling motion as illustrated in FIGS. 1 and 2 will continue to advance the vehicle across a supporting surface.

In the illustrated embodiment the vehicle 10 is shown with two forward and two rear wheels 76. It is believed that the principals of this invention would apply equally well to a vehicle which had only one forward or one rear wheel or both. The provision of the ratchet and pawl arrangement for driving the vehicle also provides a "clicking" sound during the deformation and return of the spring. Preferably, the ratchet to be utilized would be one wherein the teeth have a fine pitch. Also, the two ratchets for the front and rear axles could be provided with teeth of different pitch so as to produce different sounds. It is envisioned that the invention could be carried out by the provision of a frame structure which is generally rigid in nature and made up of two parts which are hinged together. The advantage of the use of a sinuous spring for the frame member is that the spring does not deform at a linear rate so that it is capable of accommodating children of a wide weight range, such as from 40 to 80 pounds.

Thus, it can be seen that this invention provides a toy operator-propelled vehicle wherein body thrust causes the direct impartation of movement to the supporting wheels of the vehicle without the provision of intermediate linkage or supporting surface engaging members. Moreover, the expandable and contractable medial body portion simultates a serpentine or like movement to the body of the vehicle and further accommodates the fluxture and contraction of the spring frame member responsive to the thrust imparted thereto.

The foregoing detaild description has been given for clearness of understanding only, and no unnecessary limitations should be understood therefrom, as some modifications may be obvious to those skilled in the art.

We claim:

1. An animated operator popelled toy wheeled vehicle, comprising:

a unitary leaf spring member having a generally sinusoidal configuration including a raised medial portion, a pair of spaced apart depressed lower portions on opposite sides of the medial portion, and a pair of upturned terminal end portions;

wheel support axels connected to the lower depressed portions of the leaf spring by bracket means, said axles having wheel means for rollably supporting the toy vehicle for movement over a supporting surface;

a ratchet gear connected about each of said axles for concentric rotation with the respectively associated wheel means;

a pawl member for each ratchet gear, secured to the depressed lower portions of said leaf spring adjacent the respective axles for engagement with the respective ratchet gears;

an outer animated covering for said leaf spring, ratchet gears, pawls and axles, including a generally tubular expandable and contractable accordion-like sleeve portion enclosing said spring between said lower depressed portions, and a head portion and a tail portion connected to the ends of said sleeve portion and secured to and covering the upturned terminal end portions of the leaf spring; and an operator seat secured to the raised medial portion of said leaf spring and having a portion exposed on the exterior of the accordion-like sleeve portion of said covering;

whereby deformation of the raised portion of said leaf spring in responee to generally vertical forces exerted thereon by a child sitting on said operator seat will cause thrust to be alternately imparted to each of the axles connected to the lower depressed portions of the leaf spring for propelling the vehicle along the supporting surface, with all portions of the leaf spring camouflaged by said covering.

* * * * *

UNITED STATES PATENT OFFICE
CERTIFICATE OF CORRECTION

Patent No. 3,765,693          Dated October 16, 1973

Inventor(s) Howard J. Morrison and Marvin I. Glass

It is certified that error appears in the above-identified patent and that said Letters Patent are hereby corrected as shown below:

Column 1, line 17, after "3,337,239," delete --1--.

Column 2, line 4, change "5-5" to --4-4--.

Column 3, line 46, change "confguration" to --configuration--.

Column 3, line 47, change "thr" to --the--.

Column 4, line 52, after "having a" insert --seat--.

Column 4, line 56, change "responee" to --response--.

Signed and sealed this 12th day of March 1974.

(SEAL)
Attest:

EDWARD M. FLETCHER, JR.          C. MARSHALL DANN
Attesting Officer                 Commissioner of Patents